United States Patent
Schultz et al.

(10) Patent No.: US 9,491,186 B2
(45) Date of Patent: Nov. 8, 2016

(54) METHOD AND APPARATUS FOR PROVIDING HIERARCHICAL PATTERN RECOGNITION OF COMMUNICATION NETWORK DATA

(71) Applicant: Verizon Patent and Licensing Inc., Basking Ridge, NJ (US)

(72) Inventors: Paul T. Schultz, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 591 days.

(21) Appl. No.: 13/921,826

(22) Filed: Jun. 19, 2013

(65) Prior Publication Data

US 2014/0380466 A1   Dec. 25, 2014

(51) Int. Cl.
*H04L 29/06* (2006.01)

(52) U.S. Cl.
CPC ................................. *H04L 63/1408* (2013.01)

(58) Field of Classification Search
CPC ........... H04L 63/1408; H04L 63/0218; H04L 63/20; H04L 41/5025; H04L 65/1006; H04L 65/80; G06F 21/552; G06F 21/554

USPC ............................................................. 726/22
See application file for complete search history.

(56) References Cited

U.S. PATENT DOCUMENTS

| | | | |
|---|---|---|---|
| 8,046,835 B2 * | 10/2011 | Herz | G06Q 20/201 726/25 |
| 2007/0250461 A1 * | 10/2007 | Sabe | G06F 15/18 706/12 |
| 2012/0191872 A1 * | 7/2012 | Prime | H04L 41/5025 709/239 |

* cited by examiner

*Primary Examiner* — Tu Nguyen

(57) ABSTRACT

An approach for providing hierarchical pattern recognition of communication network data is described. A network security brain platform may process communication network data associated with one or more levels of communication network hierarchies. The network security brain platform may further determine a network information pattern of the communication network data based on one or more network information pattern models. The network security brain platform may also identify a network service issue based on the determined network information pattern. The network information pattern may include a network security pattern.

24 Claims, 10 Drawing Sheets

METHOD AND APPARATUS FOR PROVIDING HIERARCHICAL PATTERN RECOGNITION OF COMMUNICATION NETWORK DATA

BACKGROUND INFORMATION

Communication network service providers are increasingly relied upon to provide security services on both their internal and external network domains. However, these security services are continually challenged by the sheer volume of network data and the changing landscape of security threats as new avenues of security attacks or threats arise. For example, the volume of network data may make it more difficult to provide timely analysis and recognition of security risks. Moreover, analyzing high volumes of network data consumes large amounts of time and processor resources. Therefore, there is a need for a scalable and resource-efficient security practice that uses hierarchical pattern recognition of the communication network data to analyze for security risks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A method, apparatus, and system for providing hierarchical pattern recognition of communication network data are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to providing hierarchical pattern recognition of communication network data, it is contemplated that these embodiments have applicability to other systems operated by different entities and to other operations wherein data is retrieved.

Figure 1:
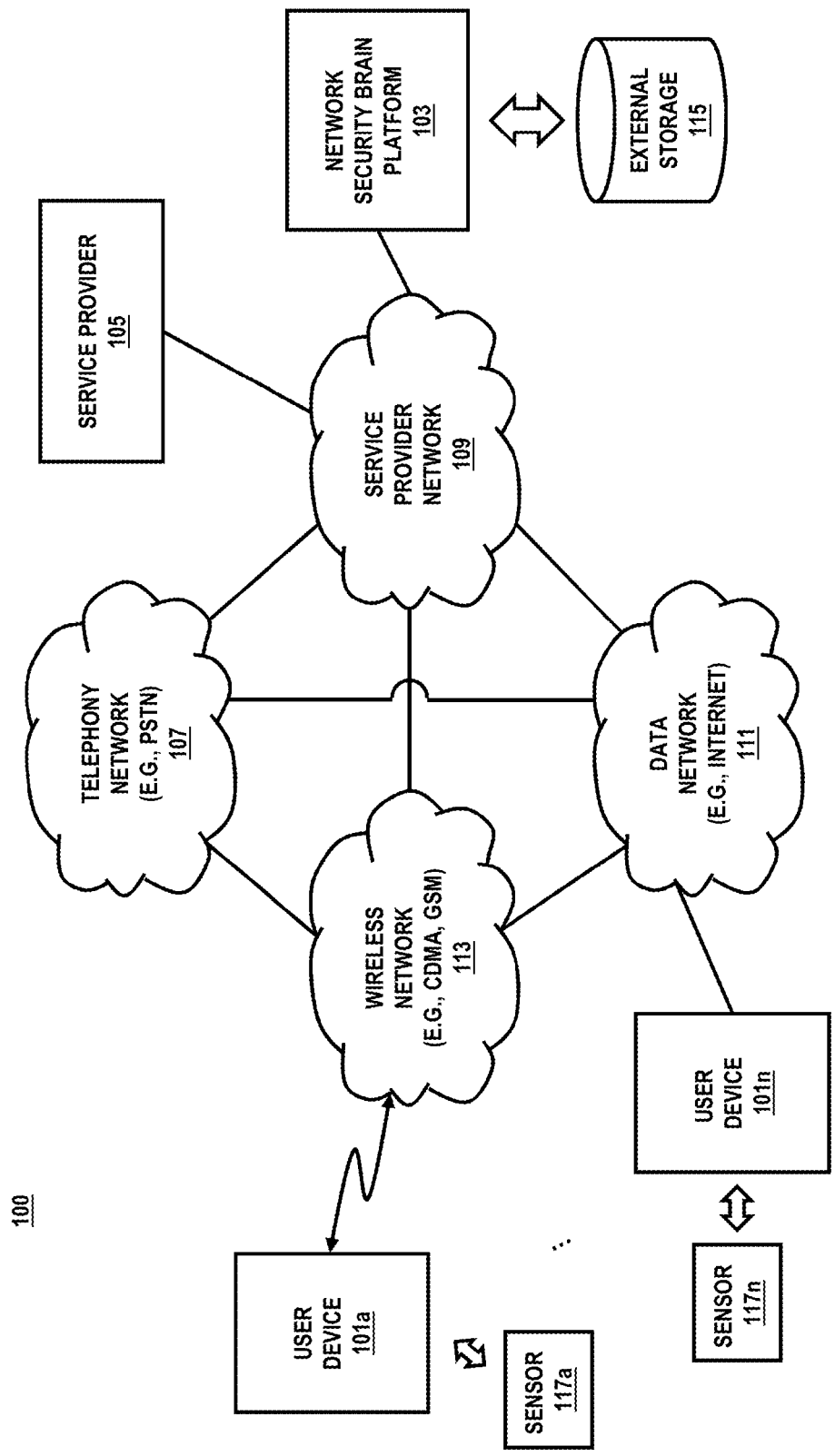
FIG. 1 is a diagram of a system capable of providing hierarchical pattern recognition of communication network data, according to an exemplary embodiment.

FIG. 1 is a diagram of a system capable of providing hierarchical pattern recognition of communication network data, according to one embodiment. Current security practices for internal communications networks include receiving events or notifications from several different kinds of intrusion detection systems (IDS) (e.g., Snort® sensors, FireEye®, NetWitness®, and Palo Alto Networks® appliances). These IDS elements are placed strategically around the network either in-line (e.g., in a position to pass, block, or drop traffic) or in "tap mode" (e.g., listen only). There are several ways for recognizing network security issues (e.g., detecting a pattern of network traffic, such as beaconing—warning communication between an infected host and a control server) to some known "bad" source address or prodding at other hosts looking potential infection opportunities. Some IDS actively chase links, unpack and execute codes, or load attachments (e.g., all in a virtual machine sandbox) to identify the security issues. Examples of patterns used to identify the issues include anomalies in client application headers, or observed communication with known "bad" IP addresses. Most IDS vendors have a platform where they are actively collecting feedback and developing new signatures.

On the other hand, unlike the security practice for the internal communication networks, the security practice for the external communication networks only receives samplings of communication network data because of the extremely large volumes of the communication network data. For example, it is common for network service providers to collect around one percent of flow data during peak traffic periods. Reliable collection and storage of the samplings is challenged as well as the analysis of the sampling. Such challenges increase as the Internet traffic increase. That is, as noted previously, security practices for the current communication networks are continually challenged by the sheer volume of the communication network data and the changing landscape of security threats. Therefore, there is a need for providing hierarchical pattern recognition of communication network data.

To address this problem, a system 100 of FIG. 1 introduces the capability to provide hierarchical pattern recognition of the communication network data. The hierarchical pattern recognition of the communication network data may be used to enable real-time communications network security services including: network security determination, network trust determination, denial of service detection, intrusion detection, fraud detection, penetration testing, network congestion detection, etc. The system 100 may include user device 101 (user devices 101*a*-101*n*) which may be associated with sensor 117 (sensors 117*a*-117*n*). The user device 101 may communicate with a service provider 105 through networks 107-113, wherein a network security brain platform 103 recognizes a pattern of communication network data between the user device 101 and the service provider 105. The network security brain platform 103 may utilize external context data in an external storage 115 in recognizing the pattern of communication network data.

FIG. 1 is a diagram of a system 100 capable of providing hierarchical pattern recognition of communication network data, according to an exemplary embodiment. In one embodiment, the user device 101 may include any type of computing device comprising a mobile handset, mobile phone, mobile station, desktop computer, tablet computer, laptop computer, netbook computer, personal digital assistants (PDAs), smart phone, wearable computer, computer server, virtual server, communication receiver, media receiver, set-top box, etc. The user device 101 may also include a machine-to-machine (M2M) device (e.g., sensor 117), which may not have any user interfaces, such as a tank monitor, an asset tracking module, a telematics OBD-II module, etc. It is also contemplated that the user device 101 may support any type of interface for supporting the presentment or exchange of data. In addition, the user device 101 may facilitate various input means for receiving and generating information, including touch screen capability, keyboard and keypad data entry, voice-based input mechanisms, gesture-based input mechanisms, and the like. Any known and future implementations of user device 101 are applicable. It is noted that, in certain embodiments, the user device 101 may be configured to transmit information using a variety of technologies (e.g., near field communication, RFID, Wi-Fi, Bluetooth®, infrared, etc.). Also, connectivity may be provided via a wired or wireless local area network (LAN). The user device 101 may communicate through numerous networks (e.g., sensor, WiFi, LTE, Internet, data center, etc.) while interacting with services.

In one embodiment, the network security brain platform 103 may include a self-organizing hierarchical system of communication network data pattern recognizers. A variety of network security and other services may be trained and enabled by human brain-like hierarchical pattern recognition of communication network data. Using artificial intelligent techniques (e.g., machine learning, neural networks, hierarchical hidden Markov models (HHMMs), vector quantization, and linear programming), the network security brain platform 103 can transform the communication network data into communication network data patterns (e.g., security data patterns) through hierarchical pattern recognition. The network security brain platform 103 can provide the user device 101 with appropriate network security services based on the hierarchical pattern recognition of communication network data. The network security brain platform 103 may access information from various network elements (e.g., sensor, Wi-Fi, LTE, Internet, data center, etc.) to provide hierarchical recognition of network security patterns for determining information associated with network security determination, network trust, denial of service attacks, intrusion detection, fraud detection, network penetration testing, network congestion detection, etc.

In one embodiment, the network security brain platform 103 may include a plurality of self-organizing network security pattern recognition module (NSPRM). The NSPRM can represent any network security pattern. The downward flow from the NSPRM may be significant in that it may predict what will be recognized, and lower-level NSPRMs may adjust their thresholds so they are more likely or less likely to send the recognition signal.

In one embodiment, NSPRM inputs may include a size, a weight, an expected variance, a likelihood, recognition signal, importance weight, etc. The size may be a vector quantization value calculated on the communication network data; the weight may represent how important this pattern is to the current recognition task; the expected variance may be an expected variability of the size; the likelihood may be a probability a pattern is expected or not expected (e.g., if a higher-level NSPRM signals a higher likelihood that this is the pattern, this NSPRM may reduce its threshold for recognition, thereby making it easier to claim the pattern was recognized); the recognition signal may be a signal to upper level NSPRMs that the pattern was recognized (a recognition score may be included); and the importance weight may be a numeric value indicating how important this pattern is to the overall recognition task.

In one embodiment, the recognition threshold may be adjusted based on the likelihood inputs. Then, the recognition signal (e.g., probability that the pattern is present) may be calculated using comparison of current inputs to stored parameters including the size and expected size based on the expected variance, factoring importance weight of current pattern recognition inputs and factoring likeliness inputs. As a result, the recognition signal and the importance weight for the pattern may be included in an output.

In one embodiment, the network security brain platform 103 may utilize various parameters including: number of vectors allowed in vector quantization, initial topology of hierarchical states (e.g., OSI 7-layer model), recognition threshold at each level of the hierarchy, parameters that control size parameter, rules regarding redundancy, effect on recognition thresholds of likeliness values, connection pruning thresholds, etc.

In one embodiment, the network security brain platform 103 may utilize transcribed communication network data to let the network security brain platform 103 discover network security rule from the data. The training corpus may be coded to include, for example, good network security pattern, network security issue 1, network security issue n, etc. The network security brain topology may self-organize based on the network security brain parameters (above) and HHMMs. An HHMM may organize its own connections between NSPRMs. The network security brain platform 103 may be capable of performing simultaneous network security pattern recognition and learning. The learning may be improved by processing additional communication network data (e.g. real-time communication network data).

In one embodiment, the network connections or patterns that are not used eventually may be pruned away. For example, infrequent network security patterns or patterns not seen for a long time may be pruned. The network connections or pattern with low probability of presence may be considered not to existent. In one embodiment, a redundancy may allow the handling of arbitrarily large and complex digital data and algorithms without the processes being distributed or destroyed by errors. The redundancy may aid in feature invariance, the ability to recognize pattern even when aspects of them are transformed. The limit of the redundancy can be calculated using linear programming, which solves for the best possible allocation of scarce resources. In one embodiment, since a communication network pattern may be an ordered sequence of other communication network patterns, each recognizer may be inherently recursive. For example, an output of a NSPRM can be fed back to other NSPRM at a lower level or to the NSPRM itself.

In one embodiment, the service provider 105 may include any service providers that communicate data with the user device 101 through the networks 107-114. The communication data between the user device 101 and the service provider 105 may be analyzed and/or intercepted by the network security brain platform 103 and analyzed for any network security issues. The network security brain platform 103 may be embedded as part of the service provider 105 or the service provider network 109. The service provider 105 may provide the network security brain platform 103 with constrains, rules, network data, etc. specific to the service provider 105 so that the network security brain platform 103 can facilitate recognizing security data patterns and providing security services responding to the security data patterns.

For illustrative purposes, the networks 107-113 may be any suitable wire line and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, the networks 107-113 may embody or include portions of a signaling system 7 (SS7) network, or other suitable infrastructure to support control and signaling functions. In one embodiment, the connections of the networks 107-113 may be associated with hierarchies (e.g., OSI 7-layer model, client-server connections, machine-to-machine connections with gateways, etc.) of communication network data patterns.

In one embodiment, the external storage 115 may include contextual data associated with network environments, securities, services, etc. For example, the external storage may contain network data, training data, communication pattern models, sensor data, machine learning algorithms, real-time data, etc. The external storage 115 may be accessed by the network security brain platform 103, as needed, in providing hierarchical pattern recognition of the communication network data.

Figure 2:
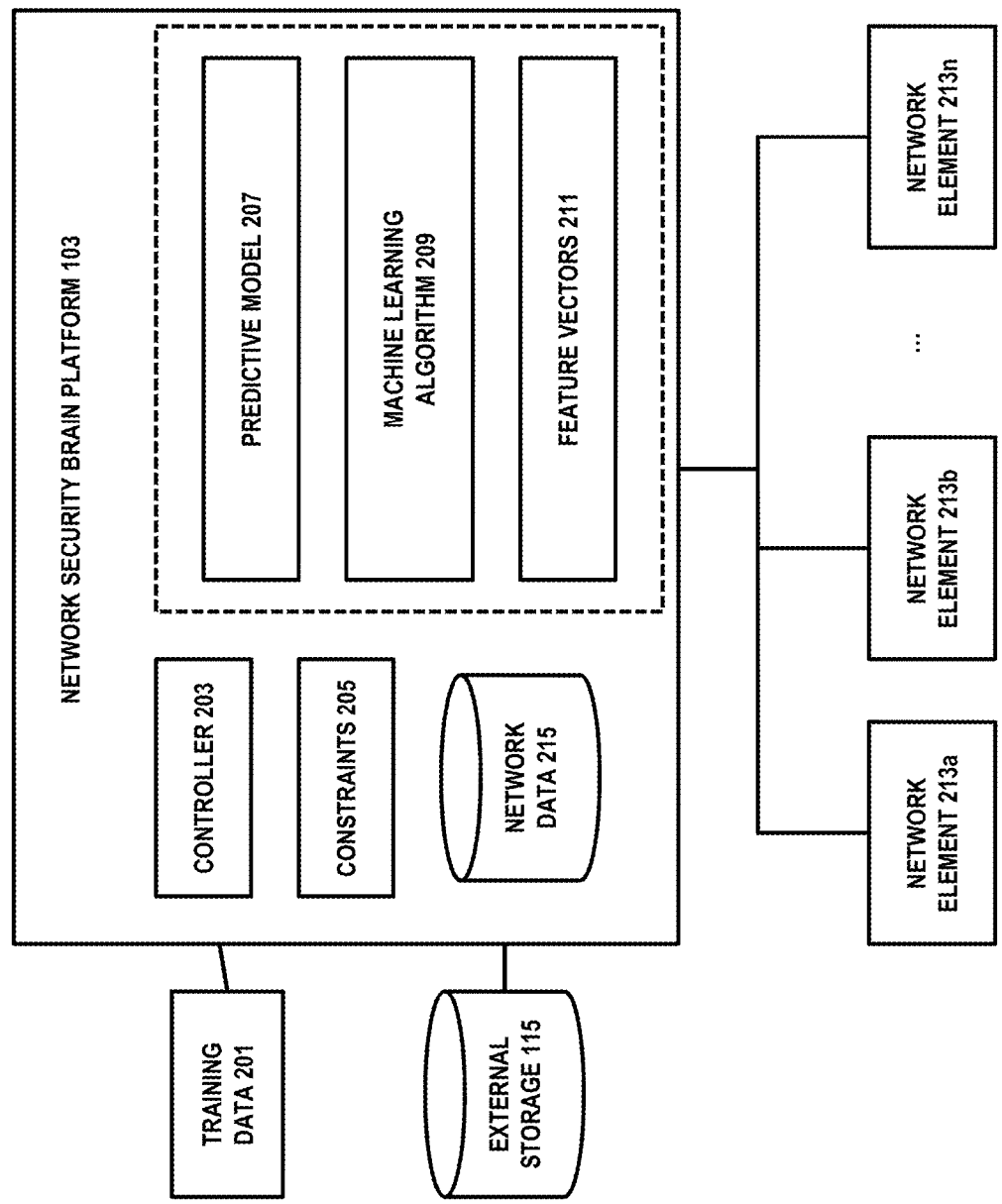
FIG. 2. is a diagram of a network security brain platform utilized in the system of FIG. 1, according to an exemplary embodiment.

FIG. 2 is a diagram of the network security brain platform 103 utilized in the system 100 of FIG. 1, according to an exemplary embodiment. In one embodiment, the controller 203 controls operations within the network security brain platform 103. The controller 203 may cause the training data 201 to be vector quantized based on the feature vectors 211, processed by a machine learning algorithm 209, and then cause predictive model 207 to be updated. The predictive model 207 may be used to produce a prediction result (e.g., probability or confidence score that a particular security pattern is recognized from network data 215). Vector quantizing the training data 201 based on the feature vectors 211, processing the training data 201 through machine learning algorithm 209, updating predictive model 207 may be parallel processed. Further, the constraints 205 may be considered as the training data is processed or as the security pattern is recognized. The network security brain platform 103 may access information from various network elements (network elements 213a-213n), such as sensor, Wi-Fi, LTE, Internet, data center, router, load balancer, software defined networking (SDN) element, etc.

In one embodiment, the network security brain platform 103 may use a neutral network and/or a HHMM to model complex network relationships and find patterns in communication network data. Such network analysis and patterns may be utilized for detection of fraud patterns, detection of security vulnerabilities, attacks and/or breaches, calculation of network trust scores, detection of network congestion and/or errors, calculation for real-time network optimizations, etc.

The neural network may consist of an interconnected group of artificial neurons, and it processes information using a connectionist approach to computation. The neural network can be an adaptive system that changes its structure during a learning phase. Neural networks can be used to model complex relationships between inputs and outputs or to find patterns in data. Neural networks may be effective in classifying short-time units, for example, individual phones and isolated words in speech recognition.

Figure 3:
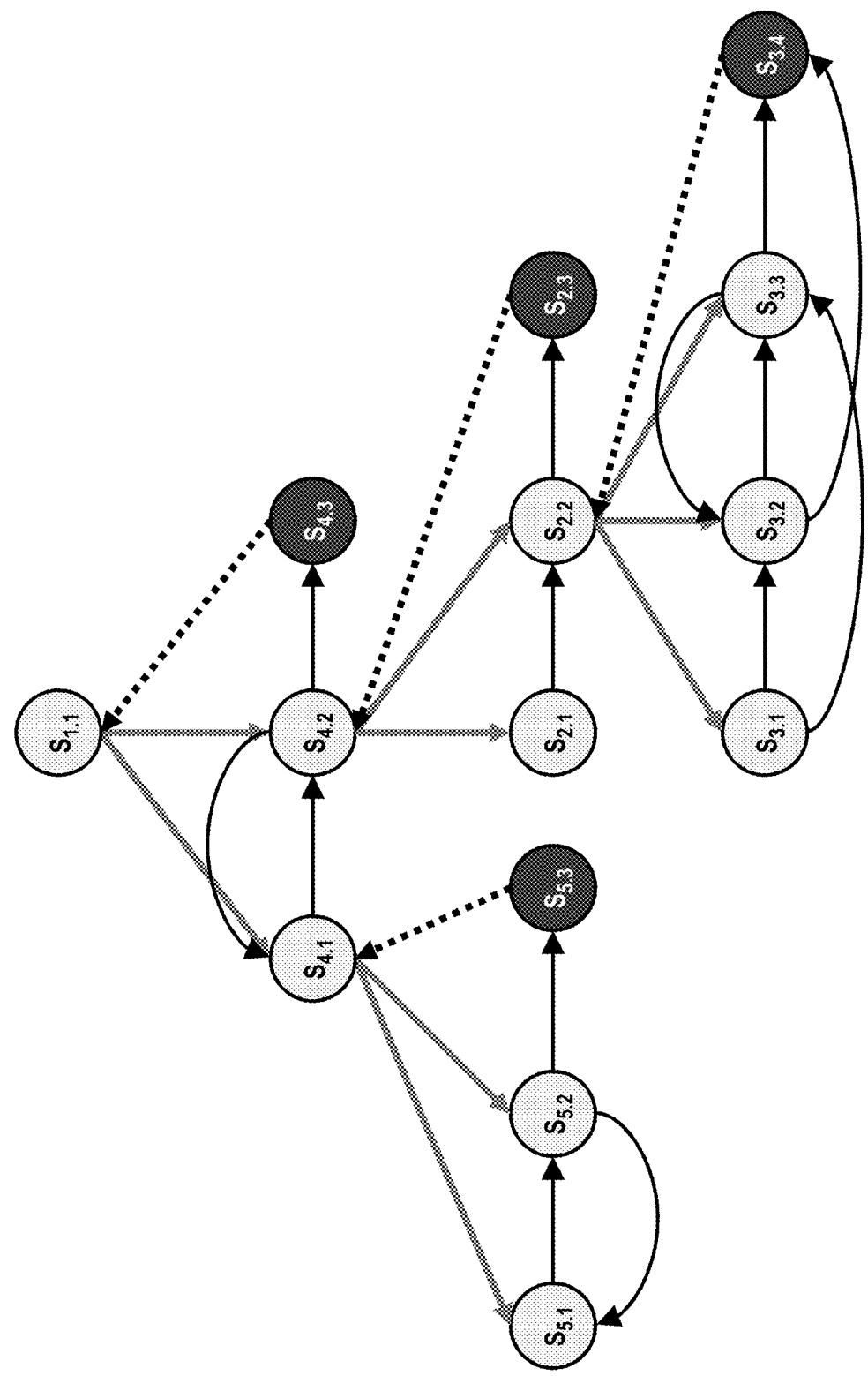
FIG. 3 is an illustration of a structure of a hierarchical hidden Markov model (HHMM), according to an exemplary embodiment.

FIG. 3 is an illustration of a structure of a hierarchical hidden Markov model (HHMM), according to an exemplary embodiment. In the HHMM, each state may be considered to be a self-contained probabilistic model, and each state of the HHMM may itself be an HHMM. Thus, the states of the HHMM may produce sequence of observation symbols rather than single observation symbol. When a state in an HHMM is activated, it may activate its own probabilistic model. For example, it (e.g., $S_{1,1}$) may activate one of the states of the underlying HHMM (e.g., $S_{4,2}$), which in turn may activate its underlying HHMM (e.g., $S_{2,2}$) and so on (e.g., $S_{3,2}$). The process may be repeated until a production state (not shown) is activated. When the production state emits a symbol, the control returns to the state that activated the production state. The internal states may not directly emit observations symbols.

By way of example, the lighter color circles are the internal states ($S_{1,1}$, $S_{2,1}$, $S_{2,2}$, $S_{3,1}$, $S_{3,2}$, $S_{3,3}$, $S_{4,1}$, $S_{4,2}$, $S_{5,1}$, and $S_{5,2}$) and the darker color circles are the terminal states ($S_{2,3}$, $S_{3,4}$, $S_{4,3}$, and $S_{5,3}$) that return control to the activating state. The production states are not shown in this figure. The downwards arrows show vertical transitions and the leftwards or rightwards arrows show horizontal transitions. The vertical transition is activated under an internal state. After a vertical transition is completed, a horizontal transition may occur to a state within the same level. When a horizontal transition leads to a terminating state, control is returned to the state in the HHMM, higher up in the hierarchy that produced the last vertical transition.

Each level of the HHMM provides additional constraints, which may be exploited to increase accuracy by combining decisions probabilistically at lower levels and making more deterministic decisions at the highest level. More complex structure pattern include higher level patterns. The HHMMs may identify the likelihood that specific pattern of communication network behavior are found in each layers of the network.

Figure 4:
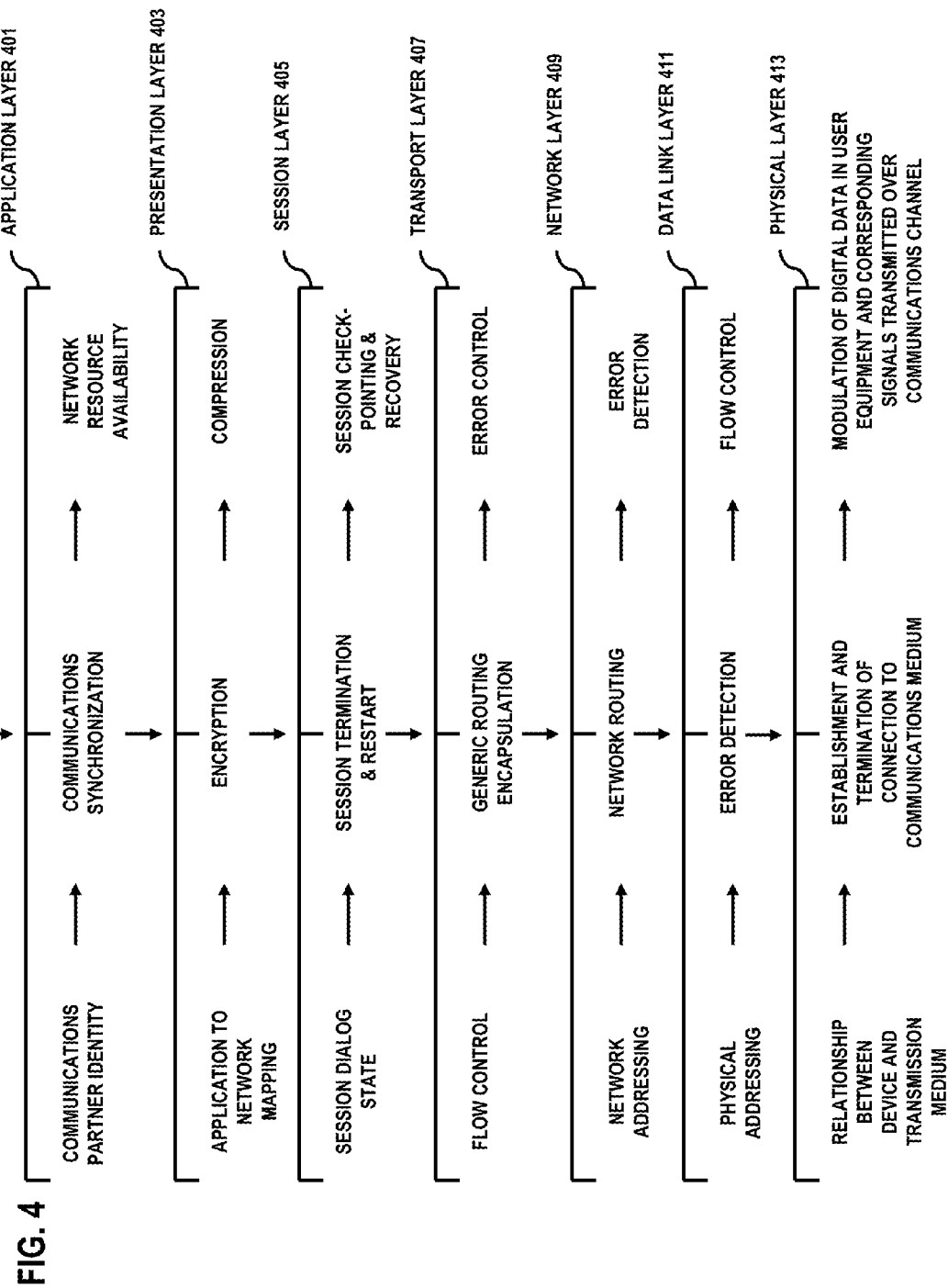
FIG. 4 is an illustration of communication network states and transitions of OSI 7-layer model, according to an exemplary embodiment.

FIG. 4 is an illustration of communication network states and transitions of OSI 7-layer model, according to an exemplary embodiment. In one embodiment, the service provider 105, for example, could capture communication network data to bootstrap the network security brain platform 103 and then to let the neural network learn and improve based on processing additional communication network data. In one embodiment, the hierarchical OSI 7-layer communication may be used to describe a particular hierarchy in communications network HHMMs, different hierarchies may be used. (e.g., not all OSI layers may need to participate in all communication network analysis). Network technologies including Software Defined Networking (SDN) can be adapted for through learning. The network security brain platform 103 may be an adaptive system that changes structure based on learning (e.g., neural network behavior).

By way of example, an application layer 401 may be associated with message format and human-machine interfaces, such that the application layer 401 may identify communications partner, synchronize communications, and check network resource availability; the presentation layer 403 may be associated with coding with binary numbers, encryption, and compressions, such that the presentation layer 403 map an application to the network and encrypt/compress the communication data; the session layer 405 may be associated with authentication, permissions, and session restoration, such that the session layer 405 may initiate a session dialog, terminate or restart the session, and recover or check-point session; the transport layer 407 may be associated with end-to-end error control, such that the transport layer 407 may controls the flow of the communication data, encapsulate generic routing, and control error; the network layer 409 may be associated with network addressing and rounding/switching, such that the network layer 409 may perform network addressing, network routing, and error detection; the data link layer 411 may be associated with error detection and flow control on physical link, such that the data link layer 411 may perform physical addressing, error detection, and flow control on the physical link; and the physical layer 413 may be associated with bit stream, physical medium, and method of representing bits, such that the physical layer 413 may determine a relationship between device and a transmission, establish and terminate a connection to a communication medium, and modulate digital data in user equipment and the corresponding signals transmitted over a communications channel.

Figure 5:
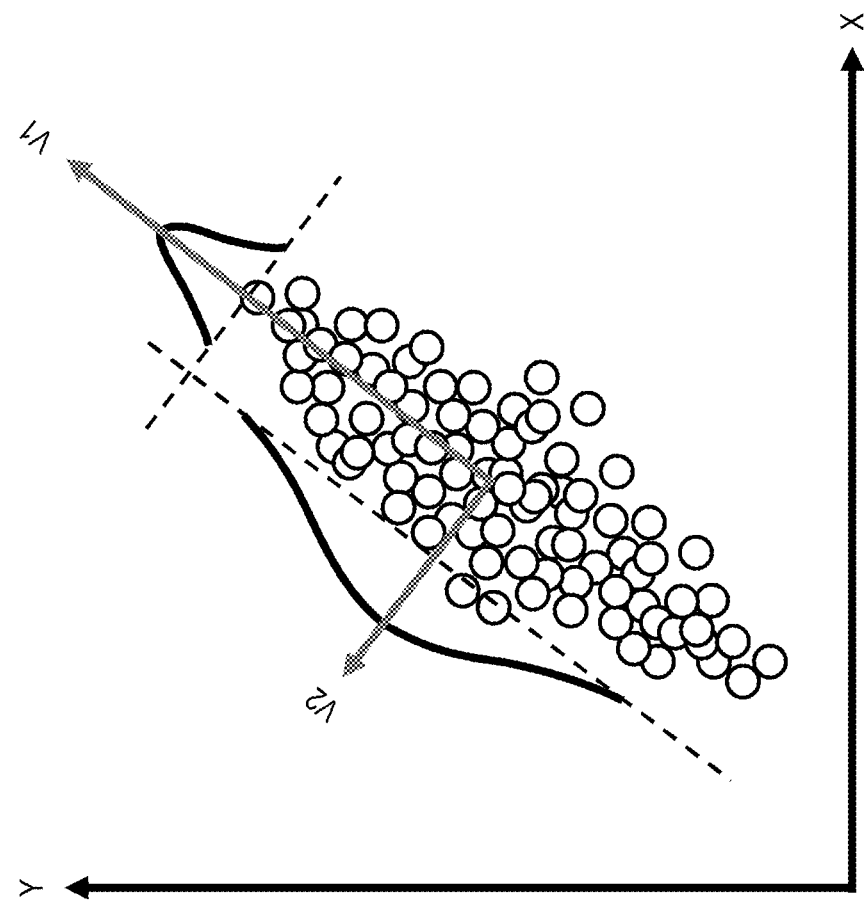
FIG. 5 is a graphical representation of a vector quantization of communication network data, according to an exemplary embodiment.

FIG. 5 is a graphical representation of a vector quantization of communication network data in a two dimensional graph (e.g., x-y axis), according to an exemplary embodiment. In one embodiment, during the vector quantization of communication network data, the communication network data may be represented by a set of numbers based on appropriate criteria (e.g., frequency an IP address has been recognized before, temporal duration of a network connection, networking details of known "bad" host, quantized client application headers, etc.). Previous data may have been mapped to a cluster of points; the geometric center (e.g., intersection of vectors V1 and V2) of those points is made as small as possible and becomes the quantized representation. The number of the clusters whose center point is closest to this new value then represents newly input communication network data.

Figure 6A:
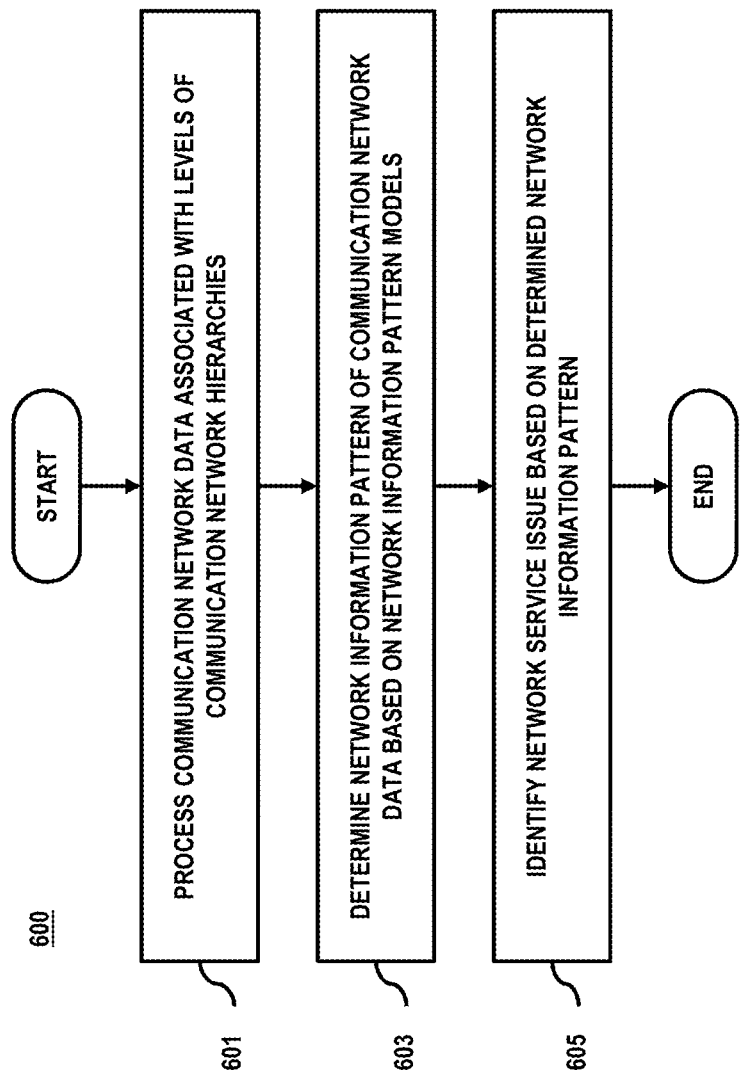
FIG. 6A is a flowchart of a process for providing hierarchical pattern recognition of the communication network data, according to one exemplary embodiment.

FIG. 6A is a flowchart of a process 600 for providing hierarchical pattern recognition of the communication network data, according to one exemplary embodiment. In step 601, the network security brain platform 103 may process communication network data associated with one or more levels of communication network hierarchies. In one embodiment, the communication network data may include any communication network data utilized, exchanged, or transmitted among the user device 101, the networks 107-113, the service provider 105, the network service brain platform 103, and other components of the system 100. Further, the communication network data may be associated with multiple levels of communication network hierarchies, for example, OSI 7-layer communication network model, as shown in FIG. 4B. The processing of communication network data may include parsing and analyzing of the data. The network security services data may be utilized in machine learning and hierarchical pattern recognition of the data.

In one embodiment, the network information pattern may be among one of one or more network information patterns, and the one or more network information patterns may be associated with at least one level of the communication network hierarchies. Further, the processing of the communication network data may include vector-quantizing the communication network data based on contextual criteria and other communication network data.

In step 603, the network security brain platform 103 may determine network information patterns of the communication network data based on one or more network information pattern models. In one embodiment, the network security brain platform 103 may be able to recognize, remember, and predict communication network data patterns. In one embodiment, the heterogeneous communication network data using communications network hierarchies (e.g., OSI 7-layer model, hierarchical communication topologies, client-server communication, peer-to-peer communication, etc.) may be transformed into network security service data based on the HHMM to determine network security patterns. The communication network patterns may include beaconing (e.g., communication between an infected host and a command and control server), prodding or probing communications network elements looking for potential infection opportunities, anomalies in client application headers, observed communication with known "bad" IP addresses, communications network security patterns (e.g., signatures) developed by third-party security vendors, knowledge of which communication network elements communicate with which other communication network elements, collection of communication network data from some specified time period before and/or after a particular network security pattern recognition event. In one embodiment, the network security pattern may be determined recursively. Since a pattern may be an ordered sequence of other patterns, each recognition may be recursive. For example, an output of a network security pattern recognition module (NSPRM) can be feedback to another NSPRM at a lower level or to the NSPRM itself.

In step 605, the network security brain platform 103 may identify a network service issue based on the determined network information pattern. In one embodiment, identifying network service issues may include network security determination, network trust determination, denial of service detection, intrusion detection, fraud detection, penetration testing, network congestion detection, etc.

Figure 6B:
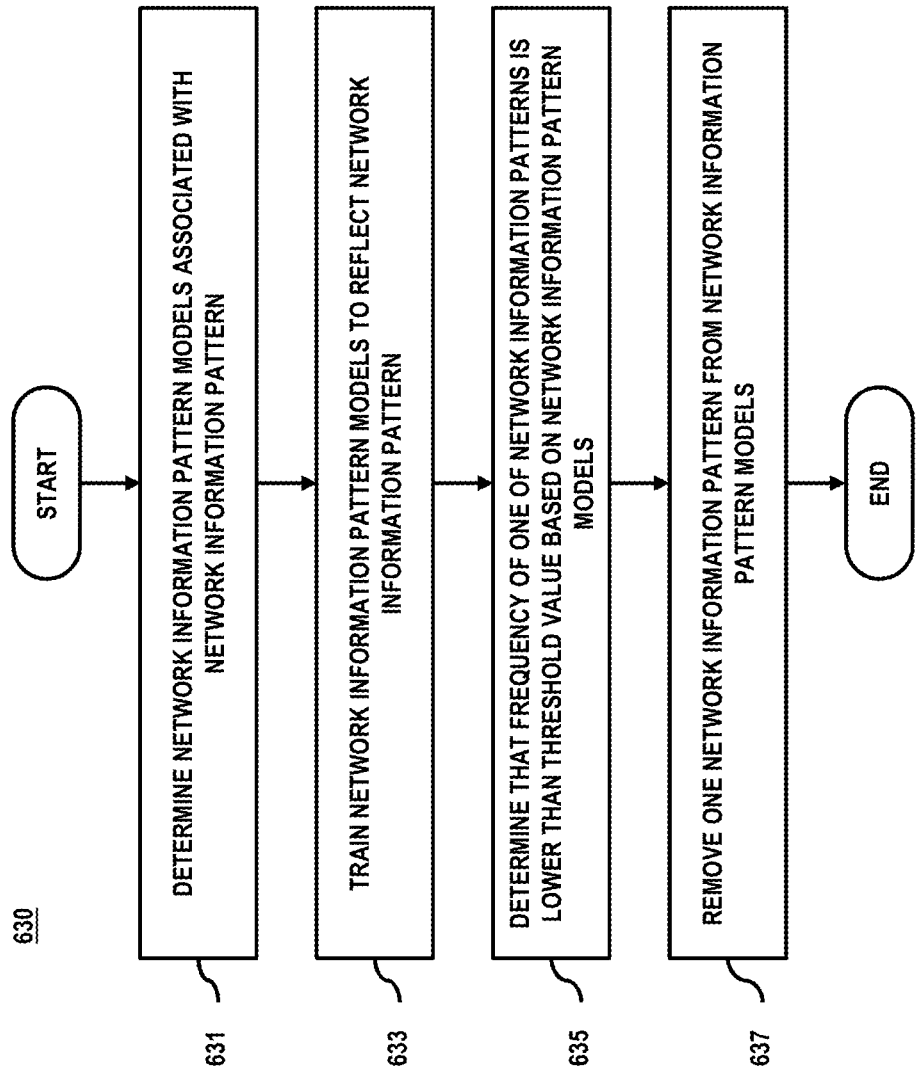
FIG. 6B is a flowchart of a process for training network data pattern models, according to one exemplary embodiment.

FIG. 6B is a flowchart of a process 630 for training the communication network data pattern models, according to one exemplary embodiment. In step 631, the network security brain platform 103 may determine the one or more network information pattern models associated with the network information pattern. In one embodiment, the network security brain platform 103 may adapt the HHMM associated with the network information patterns based on the recognized network information pattern.

In step 633, the network security brain platform 103 may train the one or more network information pattern models to reflect the network information pattern. In one embodiment, the network security brain topology may self-organize based on the network security brain parameters and the HHMMs. The HHMM may organize its own connections between the NSPRMs. The network security brain platform 103 may be capable of performing simultaneous network security pattern recognition and learning. The learning may be improved by processing additional communication network data (e.g. real-time communication network data). For example, the network security brain platform 103 may be able to bootstrap network security patterns from existing corpus of network information so that the network security brain platform 103 can improve pattern recognition accuracy by processing additional (e.g., real-time) communication network data.

In step 635, the network security brain platform 103 may determine that a frequency of one of the one or more network information patterns is lower than a threshold value based on the one or more network information pattern models. In one embodiment, the network security brain platform 103 may factor signals that increase or decrease the likelihood of the pattern being present, coming down from higher layers of abstraction, to adjust the recognition threshold accordingly. In step 637, the network security brain platform 103 may remove the one network information pattern from the one or more network information pattern models. For example, infrequent network security patterns or patterns not seen for a long time may be pruned.

Figure 6C:
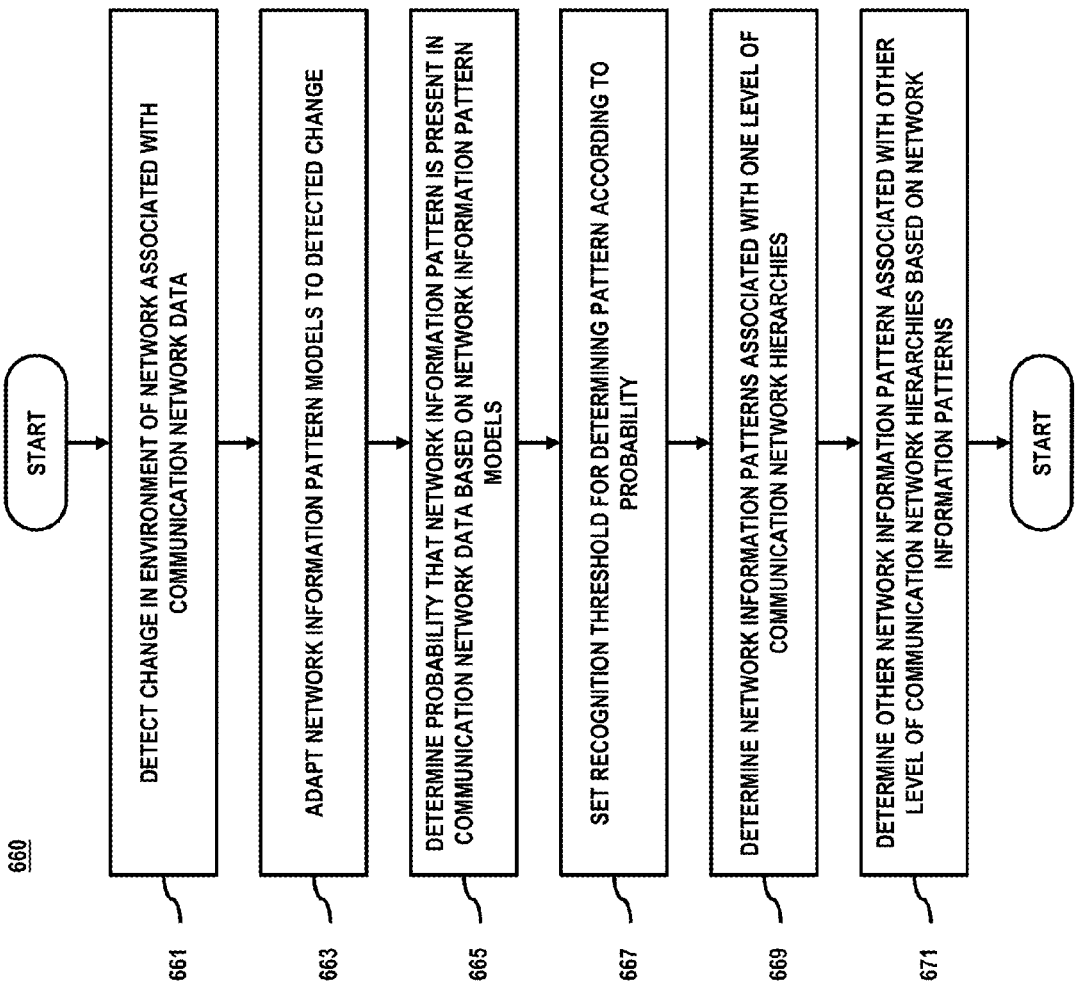
FIG. 6C is a flowchart of a process for facilitating hierarchical pattern recognition of the communication network data, according to one exemplary embodiment.

FIG. 6C is a flowchart of a process 660 for facilitating hierarchical pattern recognition of the communication network data, according to one exemplary embodiment. In step 661, the network security brain platform 103 may detect a change in an environment of a network associated with the communication network data. The change in the environment of a network may include unusual or abnormal communication activities within the network (e.g., an unauthorized access by an unknown party, unusual volume of data communicated, unrecognized data types included in the communication, anomalies in client application headers, or observed communication with known "bad" IP addresses etc.)

In step 663, the network security brain platform 103 may adapt the one or more network information pattern models to the detected change. In one embodiment, the network security brain platform 103 may determine the network information pattern models associated with the change in the environment of the network. For example, a network information pattern model associated with an unauthorized access by a party may be adapted when the network is accessed by an unauthorized party. Further, a network information pattern model associated with anomalies in client application headers may be adapted when the client application header includes anomalies.

In step 665, the network security brain platform 103 may determine a probability that the network information pattern is present in the communication network data based on the one or more network information pattern models. For example, the network security brain platform 103 may calculate and quantify a percentage of time with good connection. The network information pattern models may include compiled data about the existence of the network information patterns in past network communications. The probabilities may be determined based on the number of occurrence of network information patterns, the number of total network communications, the change in environment, and other factors.

In step 667, the network security brain platform 103 may set recognition threshold for determining the pattern according to the probability. The recognition threshold may be predetermined arbitrarily or spontaneously based on compilation of past records of the network information patterns. For example, the recognition threshold may be set as a 90%, meaning the network information pattern is deemed recognized if the probability that the network information pattern exists is 90% or the network information pattern was present 9 out of 10 times.

In step 669, the network security brain platform 103 may determine the one or more network information patterns associated with one level of the communication network hierarchies. In one embodiment, the network information pattern may be associated with one level of the OSI 7-layer hierarchical model, for example, an application layer. In that case, the network communication information and the network information pattern may be associated with a message formation, a human-machine interface, etc. In step 671, the network security brain platform 103 may determine other network information pattern associated with other level of the communication network hierarchies based on the one or more network information patterns. In one embodiment, the other network information pattern may be associated with other level of the OSI 7-layer hierarchical model, for example, a presentation layer. In that case, the network communication information and the network information pattern may be associated with coding into binary numbers, encryption, compression, etc. and may be based on the network information pattern determined in step 669. For example, the network information patterns associated with compression may be determine based on network information patterns associated with message format.

The processes described herein for providing hierarchical pattern recognition of communication network data may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
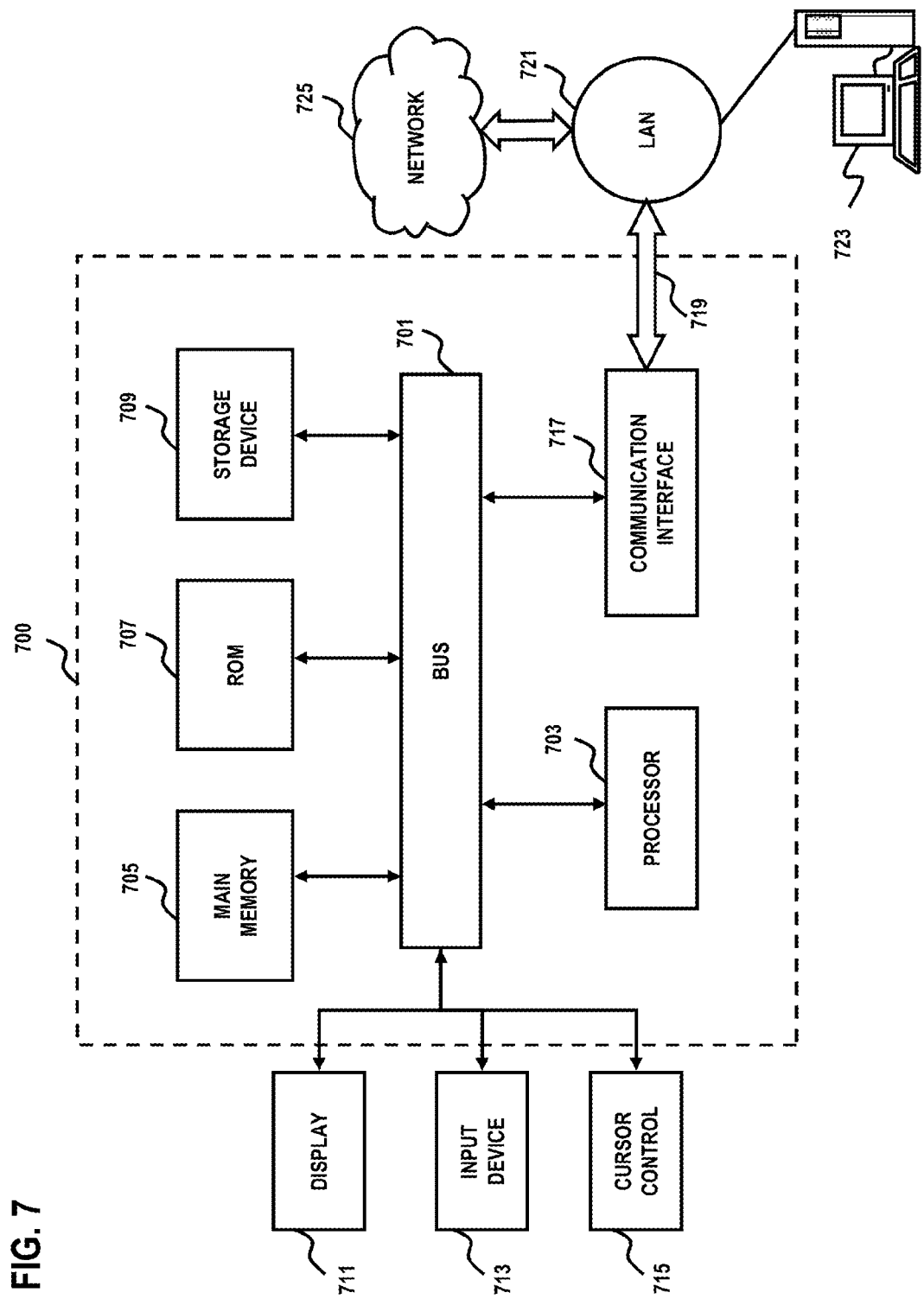
FIG. 7 is a diagram of a computer system that can be used to implement various exemplary embodiments.

FIG. 7 is a diagram of a computer system 700 that can be used to implement various exemplary embodiments. FIG. 7 illustrates computing hardware (e.g., computer system 700) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to the bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through the local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
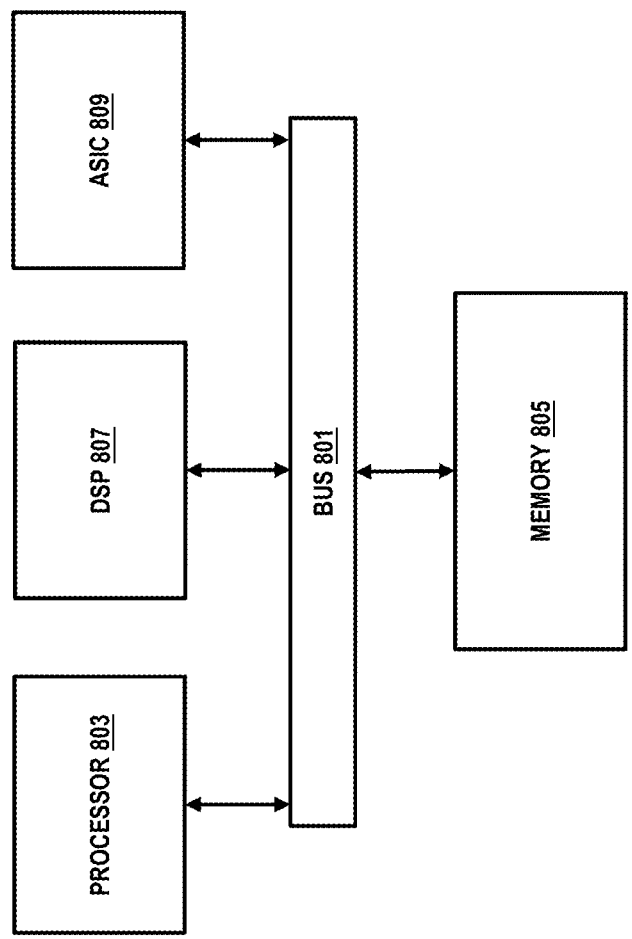
FIG. 8 is a diagram of a chip set that can be used to implement various exemplary embodiments.

FIG. 8 is a diagram of a chip set 800 that can be used to implement various exemplary embodiments. FIG. 8 illustrates the chip set 800 upon which an embodiment of the invention may be implemented. Chip set 800 is programmed to provide hierarchical pattern recognition of communication network data and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 6A-6C.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide hierarchical pattern recognition of communication network data. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   processing, via a processor, communication network data using one or more network information pattern models respectively configured to perform a recognition of a network information pattern associated respectively with one or more levels of communication network hierarchies, wherein the one or more levels of the communication network hierarchies corresponds to a different communication abstraction layer;
   determining, via the processor, the network information pattern of the communication network data based on the one or more network information pattern models; and
   identifying, via the processor, a network service issue based on the determined network information pattern, wherein the network information pattern includes a network security pattern, and
   wherein the processing of the communication network data includes vector-quantizing the communication network data based on contextual criteria and other communication network data.

2. A method of claim 1, wherein the network information pattern is among one of one or more network information patterns, and the one or more network information patterns are associated with at least one level of the communication network hierarchies.

3. A method of claim 2, further comprising:
   determining the one or more network information patterns associated with one level of the communication network hierarchies; and
   determining other network information pattern associated with other level of the communication network hierarchies based on the one or more network information patterns.

4. A method of claim 1, further comprising:
   determining the one or more network information pattern models associated with the network information pattern; and
   training the one or more network information pattern models to reflect the network information pattern.

5. A method of claim 1, further comprising:
   determining that a frequency of one of the one or more network information patterns is lower than a threshold value based on the one or more network information pattern models; and
   removing the one network information pattern from the one or more network information pattern models.

6. A method of claim 1, further comprising:
   detecting a change in environment of a network associated with the communication network data; and
   adapting the one or more network information pattern models to the detected change.

7. A method of claim 1, further comprising:
   determining a probability that the network information pattern is present in the communication network data based on the one or more network information pattern models; and
   setting recognition threshold for determining the pattern according to the probability.

8. A method of claim 1, wherein information pattern models are organized as a pattern recognition hierarchy, and wherein the determining of the network information pattern comprises processing the communication network data through each successive level of the pattern recognition hierarchy to generate a recognition signal indicating the network information pattern.

9. An apparatus comprising:
   a processor; and
   a memory including computer program code for one or more programs,
   the memory and the computer program code configured to, with the processor, cause the apparatus to perform the following,
   process communication network data using one or more network information pattern models respectively configured to perform a recognition of a network information pattern associated respectively with one or more levels of communication network hierarchies, wherein the one or more levels of the communication network hierarchies corresponds to a different communication abstraction layer;
   determine the network information pattern of the communication network data based on one or more network information pattern models; and
   identify a network service issue based on the determined network information pattern, wherein the network information pattern includes a network security pattern, and
wherein the processing of the communication network data includes vector-quantizing the communication network data based on contextual criteria and other communication network data.

10. An apparatus of claim 9, wherein the network information pattern is among one of one or more network information patterns, and the one or more network information patterns are associated with at least one level of the communication network hierarchies.

11. An apparatus of claim 10, wherein the apparatus is further caused to:
determine the one or more network information patterns associated with one level of the communication network hierarchies; and
determine other network information pattern associated with other level of the communication network hierarchies based on the one or more network information patterns.

12. An apparatus of claim 9, wherein the apparatus is further caused to:
determine the one or more network information pattern models associated with the network information pattern; and
train the one or more network information pattern models to reflect the network information pattern.

13. An apparatus of claim 9, wherein the apparatus is further caused to:
determine that a frequency of one of the one or more network information patterns is lower than a threshold value based on the one or more network information pattern models; and
remove the one network information pattern from the one or more network information pattern models.

14. An apparatus of claim 9, wherein the apparatus is further caused to:
detect a change in environment of a network associated with the communication network data; and
adapt the one or more network information pattern models to the detected change.

15. An apparatus of claim 9, wherein the apparatus is further caused to:
determine a probability that the network information pattern is present in the communication network data based on the one or more network information pattern models; and
set recognition threshold for determining the pattern according to the probability.

16. An apparatus of claim 9, wherein information pattern models are organized as a pattern recognition hierarchy, and wherein the determining of the network information pattern comprises processing the communication network data through each successive level of the pattern recognition hierarchy to generate a recognition signal indicating the network information pattern.

17. A non-transitory computer-readable storage medium carrying one or more sequences of one or more instructions which, when executed by one or more processors of a network security brain platform, cause the one or more processor to:
process communication network data using one or more network information pattern models respectively configured to perform a recognition of a network information pattern associated respectively with one or more levels of communication network hierarchies, wherein the one or more levels of the communication network hierarchies corresponds to a different communication abstraction layer;
determine the network information pattern of the communication network data based on one or more network information pattern models; and
identify a network service issue based on the determined network information pattern,
wherein the network information pattern includes a network security pattern, and
wherein the processing of the communication network data includes vector-quantizing the communication network data based on contextual criteria and other communication network data.

18. The non-transitory computer-readable storage medium of claim 17, wherein the network information pattern is among one of one or more network information patterns, and the one or more network information patterns are associated with at least one level of the communication network hierarchies.

19. The non-transitory computer-readable storage medium of claim 18, wherein the one or more processors are further caused to:
determine the one or more network information patterns associated with one level of the communication network hierarchies; and
determine other network information pattern associated with other level of the communication network hierarchies based on the one or more network information patterns.

20. The non-transitory computer-readable storage medium of claim 17, wherein the one or more processors are further caused to:
determine the one or more network information pattern models associated with the network information pattern; and
train the one or more network information pattern models to reflect the network information pattern.

21. The non-transitory computer-readable storage medium of claim 17, wherein the one or more processors are further caused to:
determine that a frequency of one of the one or more network information patterns is lower than a threshold value based on the one or more network information pattern models; and
remove the one network information pattern from the one or more network information pattern models.

22. The non-transitory computer-readable storage medium of claim 17, wherein the one or more processors are further caused to:
detect a change in environment of a network associated with the communication network data; and
adapt the one or more network information pattern models to the detected change.

23. The non-transitory computer-readable storage medium of claim 17, wherein the one or more processors are further caused to:
determine a probability that the network information pattern exists in the communication network data based on the one or more network information pattern models; and
set recognition threshold for determining the pattern according to the probability.

24. The non-transitory computer-readable storage medium of claim 17, wherein information pattern models are organized as a pattern recognition hierarchy, and wherein the determining of the network information pattern comprises processing the communication network data through each successive level of the pattern recognition hierarchy to generate a recognition signal indicating the network information pattern.

* * * * *